Figure 1:
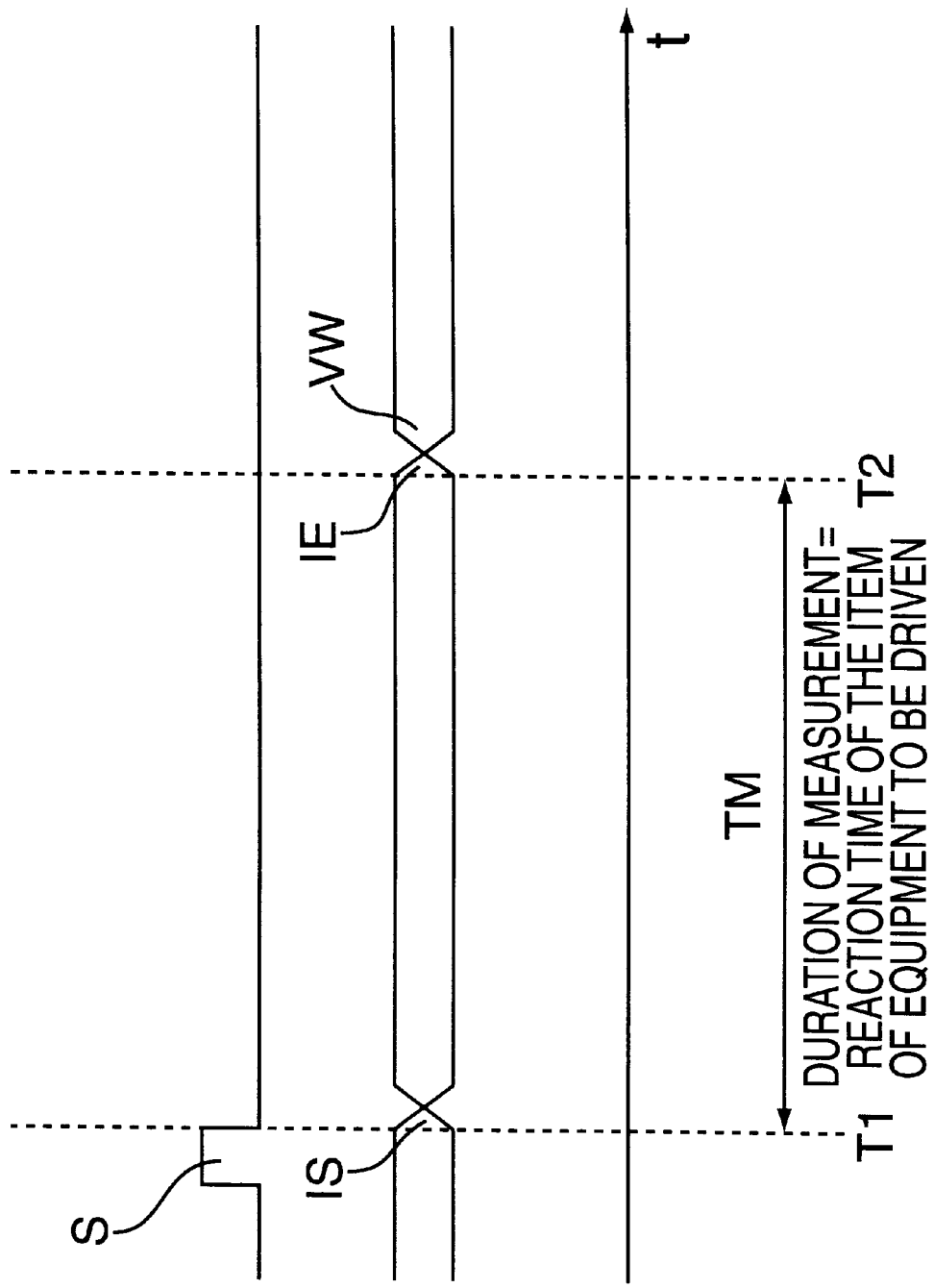

United States Patent [19]
Streichert

[11] Patent Number: 5,935,178
[45] Date of Patent: Aug. 10, 1999

[54] DEVICE FOR TAKING ACCOUNT OF THE REACTION TIME OF A DEVICE IN A TRAVEL-DEPENDENT CONTROL SYSTEM THEREFOR

[75] Inventor: Gerhard Streichert, Postbauer-Heng, Germany

[73] Assignee: Siemens Aktiengesellschaft, Munich, Germany

[21] Appl. No.: 08/930,465

[22] PCT Filed: Mar. 22, 1996

[86] PCT No.: PCT/DE96/00494

§ 371 Date: Dec. 3, 1997

§ 102(e) Date: Dec. 3, 1997

[87] PCT Pub. No.: WO96/30814

PCT Pub. Date: Oct. 3, 1996

[30] Foreign Application Priority Data

Mar. 24, 1995 [DE] Germany ........................ 295 05 468 U

[51] Int. Cl.⁶ ...................................................... G05D 1/00
[52] U.S. Cl. ................................ 701/23; 701/25; 701/66; 701/26; 364/528.31
[58] Field of Search .................................. 701/23, 25, 75, 701/201, 202, 66, 26; 364/474.35, 528.31

[56] References Cited

U.S. PATENT DOCUMENTS

| | | |
|---|---|---|
| 3,737,751 | 6/1973 | Lima . |
| 4,502,108 | 2/1985 | Nozawa et al. . |
| 5,625,561 | 4/1997 | Kato et al. ........................ 364/474.35 |
| 5,740,081 | 4/1998 | Suzuki .............................. 364/474.35 |

FOREIGN PATENT DOCUMENTS

| | | |
|---|---|---|
| 0 135 754 | 4/1985 | European Pat. Off. . |
| 0 455 938 | 11/1991 | European Pat. Off. . |
| 16 38 032 | 12/1971 | Germany . |
| 24 45 100 | 4/1975 | Germany . |
| 33 02 063 | 7/1984 | Germany . |
| 42 26 383 | 2/1994 | Germany . |
| 58-60310 | 4/1983 | Japan . |
| 2 037 456 | 7/1980 | United Kingdom . |
| 2 245 720 | 1/1992 | United Kingdom . |

*Primary Examiner*—William A. Cuchlinski, Jr.
*Assistant Examiner*—Gertrude Arthur
*Attorney, Agent, or Firm*—Kenyon & Kenyon

[57] ABSTRACT

The invention serves to take account of the reaction time of an item of equipment to be driven which, when a travel reference value, serving as a way-mark, is reached on a travel of an item of equipment in an industrial plant, is intended to be activated or deactivated, the travel being able to be covered at different speeds. The invention has the following elements: a position transmitter to register the actual value of the travel, means for storing the reaction time of the item of equipment to be driven, means for storing a first actual value of the travel ("starting actual value"), means for storing a second actual value of the travel after a time period corresponding to the reaction time of the item of equipment to be driven has elapsed ("final actual value"), means for determining a current magnitude of a lead travel by subtracting the first stored actual value from the second, and means for reducing the travel reference value ("corrected travel reference value") or increasing the actual value of the travel ("dynamized actual value") by the current magnitude of the lead travel.

2 Claims, 2 Drawing Sheets

DEVICE FOR TAKING ACCOUNT OF THE REACTION TIME OF A DEVICE IN A TRAVEL-DEPENDENT CONTROL SYSTEM THEREFOR

In automation technology, it is often necessary to initiate actions as a function of the current actual value of the travel of a first item of equipment in an industrial plant, in particular by means of electronic control systems. This travel will be referred to below as the "initiating travel". In this case, this concerns in particular a linear or rotatory travel of an element within the first item of equipment, for example a rotary shaft or a carriage of the same. The current actual value of the initiating travel is registered by a position transmitter. Thus, when predefined reference values are reached along this travel of the first item of equipment, it is possible, for example, for binary outputs of the control system to be activated or deactivated. As a result of these electronic "switching points", it is possible for example for the state of this item of equipment to be switched over, or one or more other items of equipment in the industrial plant can be actuated, for example other drives or servo motors can be switched on and off. In a programmable logic control system, a multiplicity of travel reference values of this type can be stored together with respectively associated binary control commands for an initiating travel. A specific binary control command is then executed when the actual value of the initiating travel has reached the magnitude of an associated, stored travel reference value. An arrangement of this type can also be designated an "electronic cam control mechanism".

In this case, the problem often occurs that, in the case of the activation or deactivation, initiated thereby, of an affected item of equipment, individual reaction times of the latter have to be taken into account until the item of equipment has assumed the respectively desired state, that is to say is completely in engagement. These delays until the effective action of a binary switching command must be compensated for by means of pilot control. If, at the same time, the actual value of the travel initiating a state change alters only uniformly, then it is sufficient to advance the outputting of "switching points" by a fixed value. However, if the initiating travel can be covered at variable speeds, then it is necessary to measure the respectively current value of the speed and to advance the "switching points" as a function thereof.

If, in this case, the current actual value of the speed of the travel initiating a state change is measured cyclically in a fixed time grid, then the current speed value must be converted into a so-called "adjustment travel", taking account of the reaction time, in particular stored in the form of a constant, of the respective item of equipment in the industrial plant to be driven. In this case this is the distance which is covered during the elapsing of the reaction time of the item of equipment to be driven until it reaches its complete engagement along the initiating travel of the first item of equipment, that is to say until it finally reaches the initiating travel reference value. The initiating travel reference value must be, so to speak, "shortened" by the magnitude of this speed-dependent adjustment travel, in order that, at the instant when the travel reference value is actually reached, the item of equipment to be driven is also completely in engagement, that is to say its reaction time has expired. In order to determine this adjustment travel, the following division is as a rule carried out in a complicated manner:

Adjustment travel="current actual value of the speed along the initiating travel of the first item of equipment" divided by "reaction time of the item of equipment to be driven".

The invention is based on the object of taking account of the reaction time of an item of equipment whose state can be switched over in an industrial plant when driving the same at the instant of reaching so-called way-marks on a travel, which can be covered at variable speeds, of another item of equipment by means of a control system, with low effort and in particular without discrete division.

The object is achieved with the device specified in the claim.

According to the invention, the duration of the measuring cycle for the registering of a variable corresponding to the current value of the travel speed along the initiating travel of an item of equipment in the industrial plant is not constant. Rather, the duration of the measurement corresponds precisely to the reaction time of that item of equipment in the same or in another industrial plant which, when predefined reference values of the initiating travel are reached, is intended to be activated or deactivated, that is to say in general its operating state is to be switched over. According to the invention, at the beginning of a measurement the current actual value of the initiating travel of the first item of equipment is registered and stored as a "starting actual value". After the stored reaction time of the item of equipment to be driven has elapsed, that is to say at the end of the measuring cycle, once more the current actual value which is then present of the initiating travel of the corresponding item of equipment is registered and stored as a "final actual value". According to the invention, a so-called "lead travel", which is dependent both on the current travel speed along the initiating travel and also on the individual reaction time of the item of equipment to be driven, is now formed by forming the difference between the "final actual value" and "starting actual value".

Finally, the stored travel reference values serving as way-marks along the initiating travel are corrected by this lead travel by means of reduction, that is to say so-called "corrected travel reference values" are formed. If the relevant item of equipment is then driven, if the current actual value of the travel reaches the magnitude of a "corrected travel reference value", then by this means the reaction time of the item of equipment to be driven when reaching the corrected value of one of the stored travel reference values is compensated for, since then the output of a control system is activated in sufficiently good time before reaching the original magnitude of the travel reference value.

Advantageously, the determination according to the invention of the speed-dependent lead travel is initiated cyclically, so that the stored travel reference values serving as switching points can always be shifted in accordance with the current travel speed on the initiating travel of the first item of equipment.

The invention will be explained further using the examples illustrated in the figures, which are briefly listed below.

Figure 2:
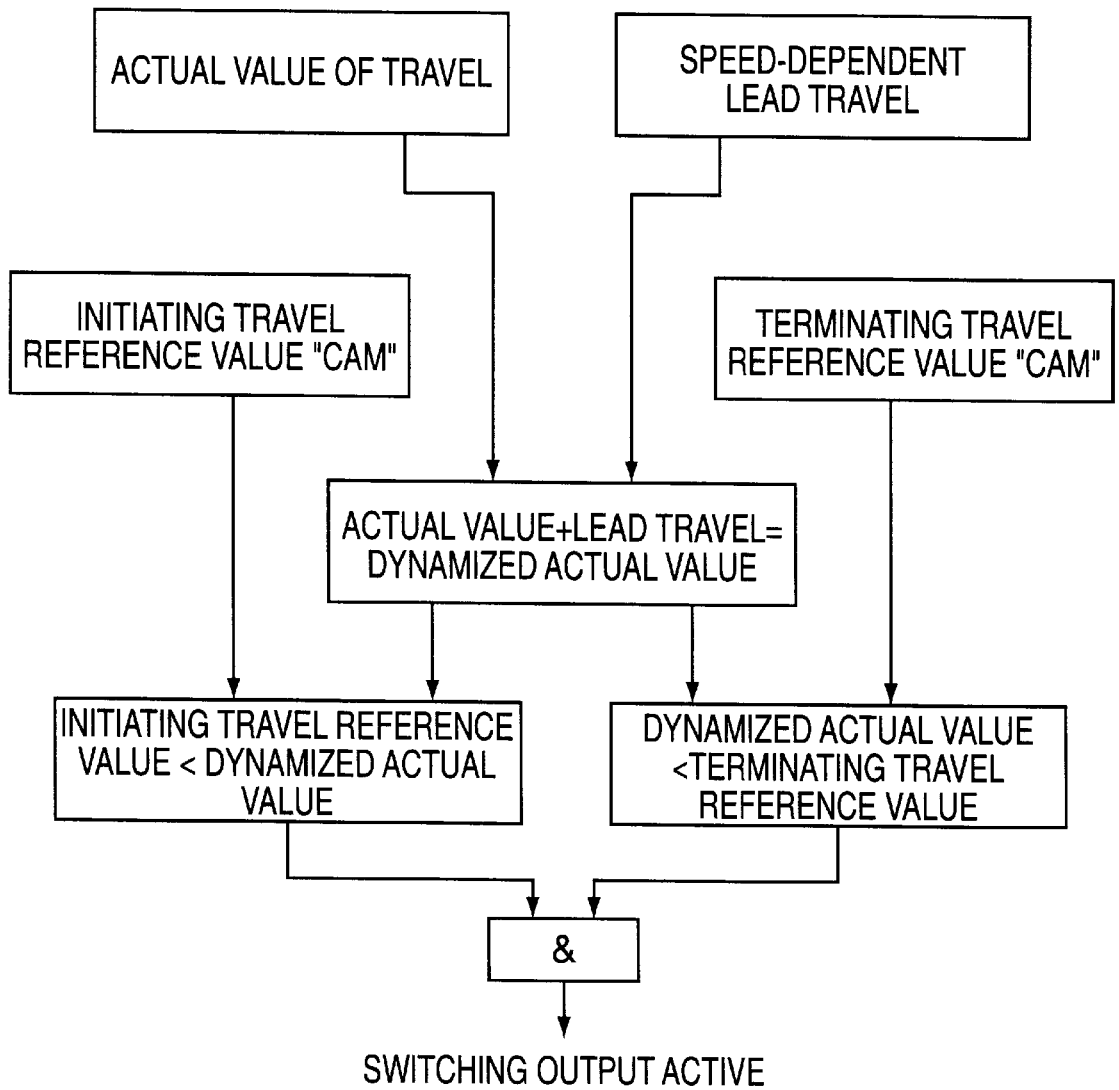

FIG. 1 shows an exemplary illustration in the form of a time diagram to explain the registering of the speed-dependent lead travel, and FIG. 2 shows the flow diagram of a preferred application of the invention in the case of a pair of successive travel reference values forming a so-called "electronic switching cam".

Illustrated in FIG. 1, by way of example and in the form of a time diagram, is the registering of the speed-dependent lead travel VW according to the invention. In this case, a measuring cycle is initiated by the falling edge of a starting pulse S. At the beginning of the cycle at the time T1, the current value IS of the initiating travel is registered and stored as the "starting actual value". The measurement is repeated at the end of the measuring cycle, which according to the invention has a measurement duration TM coinciding with the reaction time of the item of equipment to be driven, that is to say said measurement is repeated at the time T2. This "final actual value" is likewise stored, so that it is now possible, by means of a simple subtraction, to determine the current magnitude of the lead travel VW, which depends on the current travel speed along the travel, that is to say IE–IS=TM.

Taking account of this lead travel VW, which advantageously contains both an information item relating to the current travel speed and also relating to the individual reaction time of the item of equipment to be driven, in the sense of pilot control, can now be carried out on the one hand as a result of the fact that all the travel reference values along the travel, at which driving the appropriate item of equipment is intended to be carried out when said values are reached, are reduced by the current magnitude of the travel. Using the invention, this taking account of the reaction time of an item of equipment, in spite of a possibly fluctuating travel speed, can be achieved by means of simple subtraction or addition calculation operations. Complicated divisions are dispensed with.

In the case of a pair of two successive travel reference values having opposed control directions along the initiating travel, which can be designated a so-called "electronic switching cam", according to another application of the invention the taking account of the reaction time or the item of equipment to be driven can also be performed in another way. This is explained using the example of the flow diagram of FIG. 2. In this case, when the first "initiating" travel reference value is reached, this value being able to be compared with the active edge of an electronic switching cam, the associated item of equipment is firstly switched on. Finally, when the following, second travel reference value is reached, which value can be compared with the inactive edge of an electronic switching cam, the associated item of equipment is switched off once more.

In this case it is advantageous if, instead of shifting the two travel reference values constituting the switch-on and switch-off point of the "cam", the current actual value of the travel provided by a position transmitter is shifted by the current, speed-dependent value of the lead travel, that is to say is shifted, so to speak, by means of addition of the lead travel. The unchanged travel reference values, serving as start and stop values, of the "switching cam" are then compared with the "dynamized actual value", increased by the value of the speed-dependent lead travel, of the initiating travel. If both comparisons are satisfied, the switching output is activated, otherwise deactivated.

What is claimed is:

1. A device for compensating for a reaction time of a first operational device to be driven in a technical installation, the first operational device being activated, deactivated, or switched over in an operating condition upon attainment of a nominal path value on a travel path of a second operational device to be triggered, the travel path being traversed with a current actual velocity, the device for compensating comprising:

a) a position transmitter for detecting an actual value of the travel path of the second operational device;

b) means for storing the reaction time of the first operational device;

c) means for storing a first actual value of the travel path of the second operational device, the first actual value corresponding to a starting actual value;

d) means for storing a second actual value of the travel path of the second operational device after a time period corresponding to the reaction time of the first operational device has elapsed, the second actual value corresponding to a final actual value;

e) means for determining a current magnitude of a lead travel path by subtracting the first actual value from the second actual value; and f) means for reducing the nominal travel path value of the second operational device by the current magnitude of the lead travel path, wherein the reduced nominal travel path value corresponds to a corrected nominal travel path value.

2. A device for compensating for a reaction time of a first operational device to be driven in a technical installation, the first operational device being activated, deactivated, or switched over in an operating condition upon attainment of a nominal path value on a travel path of a second operational device to be triggered, the travel path of the second operational device to be triggered being traversed with a current actual velocity, the device for compensating comprising:

a) a position transmitter for detecting an actual value of the travel path of the second operational device;

b) means for storing the reaction time of the first operational device;

c) means for storing a first actual value of the travel path of the second operational device, the first actual value corresponding to a starting actual value;

d) means for storing a second actual value of the travel path of the second operational device after a time period corresponding to the reaction time of the first operational device has elapsed, the second actual value corresponding to a final actual value;

e) means for determining a current magnitude of a lead travel path by subtracting the first actual value from the second actual value; and f) means for increasing a current actual value of the travel path of the second operational device by the current magnitude of the lead travel path, wherein the increased actual value of the travel path of the second operational device corresponds to a dynamized actual value.

* * * * *